M. L. GRUBER.
TIRE CARRIER.
APPLICATION FILED SEPT. 22, 1920.
1,390,528.
Patented Sept. 13, 1921.
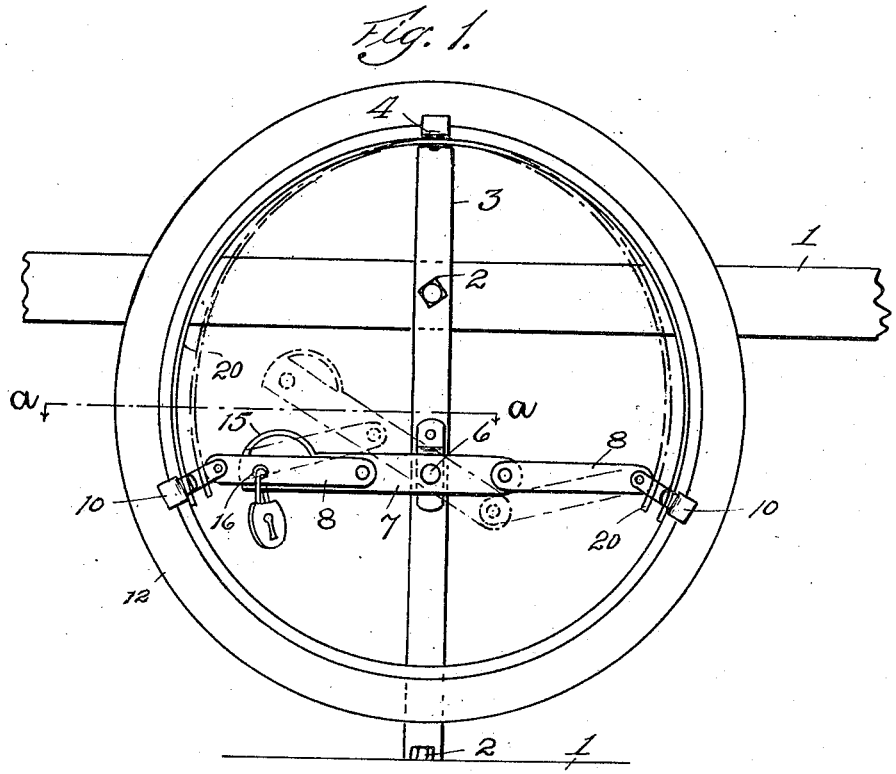
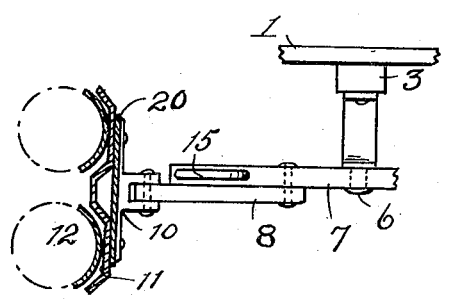
Martin L. Gruber,
Inventor

UNITED STATES PATENT OFFICE.

MARTIN L. GRUBER, OF WERNERSVILLE, PENNSYLVANIA.

TIRE-CARRIER.

1,390,528.  Specification of Letters Patent.  Patented Sept. 13, 1921.

Application filed September 22, 1920. Serial No. 411,978.

*To all whom it may concern:*

Be it known that I, MARTIN L. GRUBER, a citizen of the United States, residing at Wernersville, in the county of Berks and State of Pennsylvania, have invented certain new and useful Improvements in Tire-Carriers, of which the following is a specification.

This invention relates to improvements in tire carriers, and it is intended primarily for use in supporting and carrying a plurality of spare tires on a vehicle, although it may obviously be used for holding tires in display rooms, garages and other places where it is desirable to support the tire either for storage or exhibition.

The invention consists of a support member capable of being attached to a vehicle or other place, and an expansible member provided with a set of levers for securely fastening the tire in position.

A further object is to provide means for easily and quickly mounting or removing the tire from or on the carrier.

Another object is to provide simple means for locking the tire in position, to prevent accidental removal therefrom, or illegal removal.

The invention is more fully described in the following specification and clearly illustrated in the accompanying drawing, in which:—

Figure 1 is a front elevational view of my carrier, with a tire in position thereon, locked, and showing the unlocked position of the levers in dotted lines.

Fig. 2 is a sectional view taken on the line *a—a* of Fig. 1.

The numeral 1 designates a portion of a vehicle or other body, to which the carrier is to be attached, preferably by means of bolts 2. It is evident that the form of securing the device is immaterial and that one or more securing points may be established as will best suit circumstances.

The numeral 3 designates a supporting member by means of which it may be so secured, and this member is provided at its upper extremity with a rest or pocket 4 in which the tire is hung when placed in the carrier.

On this vertical support 3, I secure, by means of a pivot pin 6, a hand lever or rocker 7, and to this lever, at points about equally distant from the pivotal point 6, I attach a pair of links 8, by means of suitable pivot pins, and the outer ends of these links are in turn provided with pivotally mounted members 10, each of which carries a plate 11, constituting a tire-engaging shoe, provided, at its sides, with marginal flanges 12, 12 and with an arched, central portion 11$^a$, whereby a plurality of pockets are formed adapted to accommodate the rim of a tire 12. By the peculiar construction of the plate 11, it is possible to support a plurality of tires.

Referring to the hand lever 7, one end thereof is projected beyond the pivotal attachment to the link sufficiently to form a hand grip 15, and also to provide proper leverage for its operation.

This hand lever 7, as well as the link attached to the elongated end thereof, are each formed with a perforation, 16, which perforations will register with each other when the parts are in locked position, as shown in solid lines in Fig. 1 of the drawing, and in these perforations I secure a lock of any suitable construction, so that, when the parts are in the position shown, and the tire or tires in position, the device may be locked securely against theft.

The operation is simple: When it is desired to place a tire in the carrier, the hand lever is swung up, to the dotted position of Fig. 1, and this action will, through the medium of the links, draw the members 10 toward the center, and to these members, as well as to the upper end of the support 3, I have secured an expansible band 20, which will bear against the inner surface of the tire rim when the lever is reversed in movement while the members 10 will engage and prevent its removal. When the lever has thus been reversed to the position shown in Fig. 1, the lock is applied and the tires are securely held.

The expansible band or segmental plate 20 passes between the member 10 and the plate 11, as shown in Fig. 2, and, preferably, rivets 11$^b$ are passed through the member 10, the band 20 and the plate 11, securely and rigidly fastening them together.

Having thus described my invention, what I claim and desire to secure by Letters Patent is:—

In a tire-carrier, the combination of a support, a rocker pivotally supported between its ends, links pivotally secured to said rocker, a member pivotally secured to the outer end of each link, a segmental plate, of spring material, secured, intermediate its ends, to said support and bearing, at its ends, against said members, and two shoe-members, each bearing against said plate at one end thereof and provided with side flanges and an arched central portion forming depressions or pockets in which a plurality of tires may be received, and means for securing said superposed pivotally-secured members, segmental plate, and shoe-members rigidly together.

In testimony whereof I affix my signature.

MARTIN L. GRUBER.